(12) United States Patent
Yoo et al.

(10) Patent No.: US 9,034,937 B2
(45) Date of Patent: May 19, 2015

(54) **SURFACE TREATMENT METHOD FOR A SUBSTRATE USING DENATURED URUSHIOL DERIVED FROM *TOXICODENDRON VERNICIFLUUM***

(75) Inventors: Hye Jin Yoo, Busan (KR); In Woo Cheong, Daegu (KR); Chang Se Byeon, Gwangyang-si (KR); Jae Ryung Lee, Goyang-si (KR); Jin Tae Kim, Gwangyang-si (KR); Jung Hwan Lee, Gwangyang-si (KR); Yang Ho Choi, Gwangyang-si (KR)

(73) Assignee: POSCO, Pohang-si (KR)

( * ) Notice: Subject to any disclaimer, the term of this patent is extended or adjusted under 35 U.S.C. 154(b) by 300 days.

(21) Appl. No.: 13/519,617

(22) PCT Filed: Dec. 28, 2010

(86) PCT No.: PCT/KR2010/009403
§ 371 (c)(1),
(2), (4) Date: Jun. 28, 2012

(87) PCT Pub. No.: WO2011/081398
PCT Pub. Date: Jul. 7, 2011

(65) Prior Publication Data
US 2012/0288550 A1    Nov. 15, 2012

(30) Foreign Application Priority Data

Dec. 30, 2009    (KR) .................. 10-2009-0133647

(51) Int. Cl.
*C08F 2/46*    (2006.01)
*C08J 3/28*    (2006.01)
*C09D 5/14*    (2006.01)
(Continued)

(52) U.S. Cl.
CPC ................ *C09D 5/14* (2013.01); *C09D 193/00* (2013.01); *C09D 4/00* (2013.01)

(58) Field of Classification Search
USPC ......... 522/79, 83, 100, 96, 97, 103, 113, 114, 522/120, 121, 150, 152, 153, 154, 174, 178, 522/179; 428/423.1
See application file for complete search history.

(56) References Cited

FOREIGN PATENT DOCUMENTS

CN    1657582 A    8/2005
JP    8283664 A    10/1996
(Continued)

OTHER PUBLICATIONS

Studies on the Fast Drying Hybrid Urushi in Low Humidity Environment. Nagase et al. Chemistry Letters, vol. 33 (2004) No. 2 p. 90-91. [online]. Retreived online on [May 11, 2014]. Retreived from <URL:// https://www.jstage.jst.go.jp/article/cl/33/2/33_2_90/_article.>.*

(Continued)

*Primary Examiner* — Sanza McClendon
(74) *Attorney, Agent, or Firm* — The Webb Law Firm

(57) ABSTRACT

A method of treating a surface of a substrate using modified urushiol derived from *Toxicodendron vernicifluum* is provided. More particularly, the reactivity of a hydroxyl group of urushiol extracted from fresh *Toxicodendron vernicifluum* is removed before the lacquer is used as a UV coating agent for a substrate such as a steel sheet. Therefore, the substrate may have high antibacterial activity, and excellent appearance and functionalities such as far-infrared radiation, blocking of electromagnetic waves, enhanced corrosion resistance, high crosslinking speed when a low content of a photoinitiator is used, excellent surface gloss and high scratch resistance.

15 Claims, 11 Drawing Sheets

(51) Int. Cl.
    *C09D 193/00*    (2006.01)
    *C09D 4/00*    (2006.01)

(56) References Cited

FOREIGN PATENT DOCUMENTS

| KR | 20010011478 | A | | 2/2001 |
|---|---|---|---|---|
| KR | 20060103398 | A | | 12/2006 |
| KR | 1020060130398 | A | * | 12/2006 |
| KR | 1020070010323 | B1 | * | 10/2007 |
| KR | 100831662 | B1 | | 5/2008 |
| KR | 20080045926 | A | | 5/2008 |
| KR | 20090011881 | A | | 2/2009 |
| WO | 2008062918 | A1 | | 5/2008 |
| WO | 2009173101 | A2 | | 2/2009 |

OTHER PUBLICATIONS

Possiblity of industrial coating by modification of urushi lacquer property. Nagase et al. Toso Kogaku (2002), 37(9), 322-328.*

* cited by examiner wherein, $R=C_{15}H_{31-2n}$, $n=0,1,2,3$

Control Specimen, after 24 hours

Test Specimen, after 24 hours/TS9-1332

Test Specimen, after 24 hours/TS9-1334

Test Specimen, after 24 hours/TS9-1333

SURFACE TREATMENT METHOD FOR A SUBSTRATE USING DENATURED URUSHIOL DERIVED FROM *TOXICODENDRON VERNICIFLUUM*

CROSS-REFERENCE TO RELATED APPLICATION

This application claims priority to and the benefit of Korean Patent Application No. 2009-0133647, filed Dec. 30, 2009, the disclosure of which is incorporated herein by reference in its entirety.

BACKGROUND

1. Field of the Invention

The present invention relates to a method of treating a surface of a substrate using modified urushiol derived from fresh *Toxicodendron vernicifluum*, and more particularly, to a method of treating a surface of a substrate using modified urushiol derived from fresh *Toxicodendron vernicifluum* which may exhibit high antibacterial activity and excellent surface properties (surface appearance and functionalities) such as far-infrared radiation, blocking of electromagnetic waves, enhanced corrosion resistance, high crosslinking speed obtained even when photoinitiator content is low, excellent surface gloss and high scratch resistance since reactivity of a hydroxyl group in urushiol extracted from fresh *Toxicodendron vernicifluum* is removed before urushiol is used as a UV coating agent for a substrate such as a steel sheet.

2. Discussion of Related Art

*Toxicodendron vernicifluum*, commonly known as Chinese lacquer tree grown in Central Asia and Himalaya, is usually produced in East Asian countries such as China, the Tropics, Japan and Korea. Oriental lacquer obtained from the trees is widely used as coating material for metals and wood due to its advantageous effects such as antibacterial activity, weather resistance, wear resistance, water resistance, corrosion resistance, etc., and is also used in Chinese medicine as a medical herb. It is known that the main ingredients of the raw lacquer are urushiol (60 to 70%), water (approximately 20%), other water- and oil-soluble proteins, laccase and gums.

Urushiol is known as a catechol having an unsaturated linear alkyl chain, and generally understood as the main cause of poison ivy rash. Such urushiol is known to easily dissolve in various polar and non-polar solvents, and thus a method of extracting urushiol using an organic solvent is well developed. As shown in FIG. 1, raw lacquer is composed of an urushiol monomer and an oligomer having a molecular weight of approximately 1,000 to 5,000 g/mol through an enzyme reaction of a laccase contained therein when the raw lacquer is in a natural state or left in the air.

Recently, many endeavors to solve the above-mentioned problems of urushiol, and develop coating and painting products having excellent antibacterial activity through polymerization and crosslinking of urushiol have been reported. However, a classic example is free radical polymerization in the presence of a laccase or peroxide initiators. While the former requires long polymerization and crosslinking time, the latter can complete the reaction within a few hours. Therefore, the latter has been studied and developed for various applications. According to Korean Patent Publication No. 2008-0045926, expensive urushiol was used in a wide range of weight ratio, for example, 100:1 to 100 based on UV paint.

However, it has been indicated that a catechol structure in urushiol has problems of decreased gloss of a coated surface, low polymerization speed, low cure rate, and high initiator content due to a side reaction (a radical capture reaction) shown in FIG. 2 on free radical polymerization (including both of thermal curing and photocuring).

SUMMARY OF THE INVENTION

The present invention is directed to providing a substrate having excellent properties by blocking a hydroxyl group of urushiol extracted from fresh *Toxicodendron vernicifluum* before the urushiol is used as a UV coating agent, a method of manufacturing the same, and a use thereof.

One aspect of the present invention provides a composition for UV coating including a binder, and a compound represented by Formula 1.

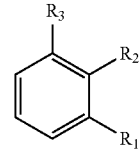

[Formula 1]

In Formula 1, $R_1$ is alkyl having 1 to 30 carbon atoms, alkylene having 2 to 30 carbon atoms, alkynyl having 2 to 30 carbon atoms, or aryl having 5 to 12 carbon atoms, $R_2$ and $R_3$ are independently —O—C(O)NHR, —O—C(O)—R, —O—Si(R)$_x$(R')$_{3-x}$, —O—C(R)$_x$(R)$_{3-x}$, or —O—C(O)—(CH$_2$)$_y$—C(O)—OH.

Here, R is alkyl having 1 to 30 carbon atoms, alkylene having 2 to 30 carbon atoms, alkynyl having 2 to 30 carbon atoms, aryl having 5 to 12 carbon atoms, or aralkyl having 6 to 24 carbon atoms.

The substituent R may be substituted or unsubstituted with at least one substituent selected from the group consisting of alkyl having 1 to 12 carbon atoms, alkylene having 2 to 12 carbon atoms, alkynyl having 2 to 12 carbon atoms, and aryl having 5 to 12 carbon atoms.

R' is alkoxy having 1 to 12 carbon atoms, x is an integer of 1 to 3, and y is an integer of 1 to 4.

Another aspect of the present invention provides a method of treating a surface of a substrate including preparing a composition for UV coating including a compound prepared by modifying a hydroxyl group of a compound represented by Formula 2, and applying the composition to a substrate and curing the composition.

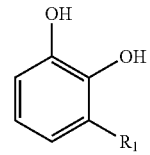

[Formula 2]

In Formula 2, $R_1$ is alkyl having 1 to 30 carbon atoms, alkylene having 2 to 30 carbon atoms, alkynyl having 2 to 30 carbon atoms, or aryl having 5 to 12 carbon atoms.

Still another aspect of the present invention provides a surface-treated substrate including a substrate and a coating layer formed on one or both surfaces of the substrate by curing a composition for UV coating according to the present invention.

Yet another aspect of the present invention provides a product using the surface-treated substrate.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Figure 1:
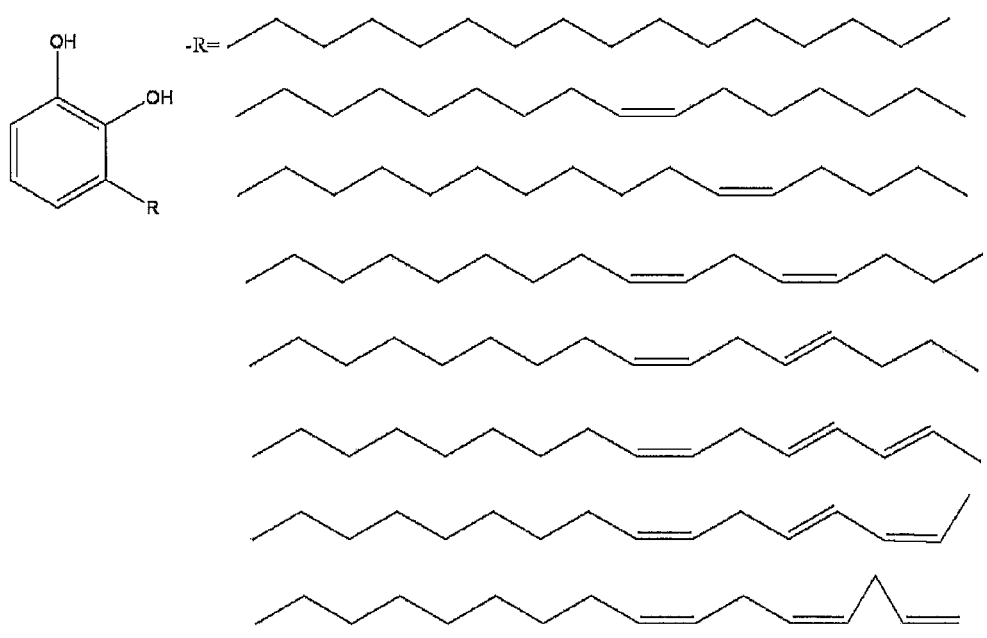
FIG. 1 illustrates a formula of an urushiol monomer extracted from raw lacquer according to the present invention.
Figure 2:
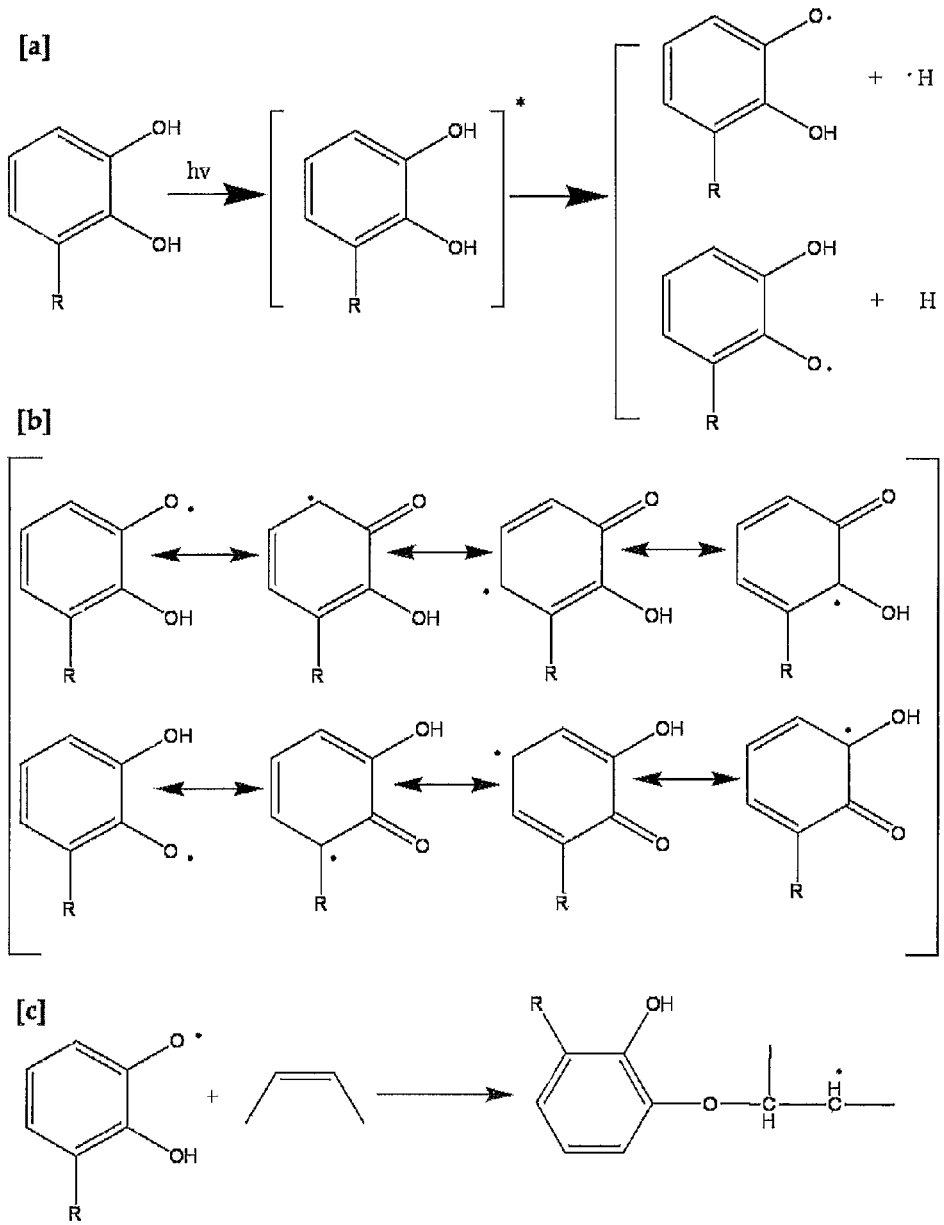
FIG. 2 illustrates a radical capture reaction and a polymerization mechanism occurring in photocuring of urushiol extracted from raw lacquer according to the present invention.

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, exemplary embodiments of the present invention will be described in detail below. To aid in understanding the present invention, like numbers refer to like elements throughout the description of the figures, and the description of the same elements will be not reiterated.

Hereinafter, configuration of the present invention will be described in detail.

The present invention relates to a composition for UV coating including a binder and a compound represented by Formula 1.

[Formula 1]

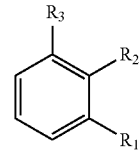

In Formula 1, $R_1$ is alkyl having 1 to 30 carbon atoms, alkylene having 2 to 30 carbon atoms, alkynyl having 2 to 30 carbon atoms or aryl having 5 to 12 carbon atoms, $R_2$ and $R_3$ is independently —O—C(O)NHR, —O—C(O)—R, —O—Si(R)$_x$(R')$_{3-x}$, —O—C(R)$_x$(R')$_{3-x}$, or —O—C(O)—(CH$_2$)$_y$—C(O)—OH.

Here, R is alkyl having 1 to 30 carbon atoms, alkylene having 2 to 30 carbon atoms, alkynyl having 2 to 30 carbon atoms, aryl having 5 to 12 carbon atoms, or aralkyl having 6 to 24 carbon atoms.

The substituent R may be substituted or unsubstituted with at least one substituent selected from the group consisting of alkyl having 1 to 12 carbon atoms, alkylene having 2 to 12 carbon atoms, alkynyl having 2 to 12 carbon atoms, and aryl having 5 to 12 carbon atoms.

R' is alkoxy having 1 to 12 carbon atoms, x is an integer of 1 to 3, and y is an integer of 1 to 4.

The compound of Formula 1 is modified urushiol having enhanced UV curing reactivity by blocking a hydroxyl group of urushiol, known as the main ingredient of raw lacquer (or oriental lacquer) that can be extracted from *Toxicodendron vernicifluum*, or trees of the *Toxicodendron* family, to remove its reactivity. The blocking of the hydroxyl group will be described below in a step of modifying a surface of urushiol represented by Formula 2 in a method of treating a surface of a substrate according to the present invention, and the blocking can inhibit an effect of stabilizing radical resonance of a catechol structure and consumption of radicals and retardation in radical. Therefore, the modified urushiol may exhibit excellent characteristic properties such as antibacterial activity, far-infrared radiation, blocking of electromagnetic waves, enhanced corrosion resistance, excellent surface gloss and high scratch resistance without any side effects occurring during photocuring when the modified urushiol is used as a UV coating agent.

Terms used to define substituents of the compound of Formula 1 according to the present invention are as follows:

Unless otherwise particularly defined, the term "alkyl" used herein is a linear, branched or cyclic saturated hydrocarbon having 1 to 30 carbon atoms. Examples of the hydrocarbon having 1 to 30 carbon atoms include, but are not limited to, methyl, ethyl, propyl, butyl, pentyl, hexyl, heptyl, octyl, nonyl, decyl, isopropyl, isobutyl, sec-butyl and tert-butyl, isopentyl, neopentyl, isohexyl, isoheptyl, isooctyl, isononyl, or isodecyl. In addition, the alkyl includes "cycloalkyl." Unless otherwise particularly defined, the cycloalkyl includes a single or fused ring as a non-aromatic, saturated hydrocarbon ring having 3 to 12 carbon atoms. Representative examples of the cycloalkyl having 3 to 12 carbon atoms include, but are not limited to, cyclopropyl, cyclobutyl, cyclopentyl, cyclohexyl, cycloheptyl, and cyclooctyl.

The term "alkylene" used herein is a bivalent organic group induced from the alkyl, and a preferable range of the number of carbon atoms is the same as that of the alkyl.

Unless otherwise particularly defined, the term "alkynyl" used herein refers to a linear or branched unsaturated hydrocarbon having 2 to 30 carbon atoms, which have at least one triple bond. Examples of alkynyl having 2 to 24 carbon atoms may include, but are not limited to, acetylene, propyne, 1-butyne, 2-butyne, isobutyne, sec-butyne, 1-pentyne, 2-pentyne, isopentyne, 1-hexyne, 2-hexyne, 3-hexyne, isohexyne, 1-heptyne, 2-heptyne, 3-heptyne, 1-octyne, 2-octyne, 3-octyne, 4-octyne, 1-nonyne, 2-nonyne, 3-nonyne, 4-nonyne, 1-decyne, 2-decyne, 3-decyne, 4-decyne, and 5-decyne.

Unless otherwise particularly defined, the term "aryl" used herein refers to a 5- to 12-membered aromatic cyclic compound. Examples of the aryl group include, but are not limited to, phenyl, biphenyl, naphthyl, and anthracenyl.

Unless otherwise particularly defined, the term "aralkyl" used herein refers to an aryl-alkyl- group described above in the aryl and alkyl groups. A preferable aralkyl includes a lower alkyl group. Non-limiting examples of a suitable aralkyl group include benzyl, 2-phenethyl, and naphthalenylmethyl. Binding to a parent residue is performed through an alkyl group.

Each of the alkyl, alkylene, alkynyl, aryl and aralkyl may be optionally substituted with at least one substituent selected from the group consisting of alkyl having 1 to 12 carbon atoms, alkylene having 2 to 12 carbon atoms, alkynyl having 2 to 12 carbon atoms, and aryl having 5 to 12 carbon atoms.

In the compound of Formula 1, specifically, $R_1$ is alkyl having 12 to 25 carbon atoms or alkylene having 12 to 25 carbon atoms.

$R_2$ and $R_3$ are independently —O—C(O)NHR, —O—C(O)—R, —O—Si(R)$_x$(R')$_{3-x}$, —O—C(R)$_x$(R')$_{3-x}$, or —O—C(O)—(CH$_2$)$_y$—C(O)—OH.

Here, R is alkyl having 1 to 12 carbon atoms, aryl having 5 to 12 carbon atoms, or aralkyl having 6 to 12 carbon atoms, and the substituent R may be substituted or unsubstituted with at least one substituent selected from the group consisting of alkyl having 1 to 6 carbon atoms, alkylene having 2 to 6 carbon atoms, and aryl having 5 to 12 carbon atoms, R' may be an alkoxy having 1 to 6 carbon atoms, x may be an integer of 1 to 3, and y may be an integer of 1 to 4.

In the compound of Formula 1, specifically, $R_1$ is $C_{15}H_{31-2n}$, and n is one of 1 to 3. $R_2$ and $R_3$ are independently —O—C(O)NHR, and R is aralkyl having 6 to 12 carbon atoms, which is substituted or unsubstituted with alkyl having 1 to 12 carbon atoms, or alkylene having 2 to 6 carbon atoms.

In the compound of Formula 1, specifically, $R_1$ may be (CH$_2$)$_{14}$CH$_3$, (CH$_2$)$_7$CH=CH(CH$_2$)$_5$CH$_3$, (CH$_2$)$_7$CH=CHCH$_2$CH=CH(CH$_2$)$_2$CH$_3$, (CH$_2$)$_7$CH=CHCH$_2$CH=CHCH=CHCH$_3$, or (CH$_2$)$_7$CH=CHCH$_2$CH=CHCH$_2$CH=CH$_2$, and $R_2$ and $R_3$ may be independently —O—C(O)NHR. Here, R may be aralkyl having 6 to 12 carbon atoms, which is substituted or unsubstituted with alkyl having 1 to 8 carbon atoms, benzyl or alkylene having 2 to 4 carbon atoms.

In the composition for UV coating according to the present invention, the compound of Formula 1 may be included at a content of 1 to 50 parts by weight. When the content of the compound is less than 1 part by weight, it is difficult to express properties of urushiol, and when the content of the compound is more than 50 parts by weight, since a content of urushiol is relatively higher compared to that of a UV solution, UV curing cannot be completely done, and thus unreacted materials remain on a coated surface.

In the composition for UV coating according to the present invention, the binder may include an oligomer and a diluent.

The oligomer may use independently or at least two of epoxy acrylate, urethane-based modified epoxy acrylate, urethane acrylate, polyester acrylate, polyester acrylate, acrylic acrylate, silicon acrylate, melamine acrylate, acrylic acrylate, a polythiolacrylate derivative, and polythiolspiroacetal.

The epoxy acrylate may be aromatic bifunctional epoxy acrylate, novolac epoxy acrylate or aliphatic epoxy acrylate without limitation.

The polymerization of the urethane acrylate may be performed by a hydrogen transfer reaction between diisocyanate and polyol having active hydrogen, and therefore the urethane acrylate may be produced by the reaction between isocyanate and hydroxyl alkyl acrylate, but the present invention is not limited thereto.

More specifically, the oligomer may include 25 to 45 parts by weight of urethane-based modified epoxy acrylate; and 10 to 25 parts by weight of urethane acrylate. When the content of the urethane-based modified epoxy acrylate oligomer is less than 25 parts by weight, corrosion resistance and scratch resistance are poor, and when the content of the urethane-based modified epoxy acrylate oligomer is more than 45 parts by weight, viscosity of the paint may increase, and thus workability may decrease. More preferably, the urethane-based modified epoxy acrylate oligomer may be included at a content of 30 to 38 parts by weight.

When the content of the urethane acrylate oligomer is less than 10 parts by weight, coating layer hardness may increase and thus, bendability (processibility), characteristically curve processibility, and adhesion property may be poor, and when the content of the urethane acrylate oligomer is more than 25 parts by weight, coating layer hardness may decrease and thus, scratch resistance may also decrease. More particularly, the urethane acrylate oligomer may be included at a content of 15 to 20 parts by weight.

In addition, the diluent may be a monofunctional or trifunctional acryl monomer, which may be, but is not limited to, at least one selected from monofunctional acryl monomers such as acryl morpholine (ACMO), tetrahydrofurfuryl acrylate (THFA), hydroxyethyl acrylate (HEA), hydroxylpropyl acrylate (HPA) and isobonyl acrylate (IBOA); and trifunctional acryl monomers such as trimethylolpropane triacrylate, ethoxylated (3 mol) trimethylolpropane triacrylate, ethoxylated (6 mol) trimethylolpropane triacrylate, propoxylated (3 mol) trimethylolpropane triacrylate (TMPTA), and pentaerythritol triacrylate (PETA).

More specifically, the acryl-based monomer may include 25 to 35 parts by weight of a monofunctional acryl monomer; and 7 to 15 parts by weight of a trifunctional acryl monomer.

When the content of the monofunctional acryl monomer is less than 25 parts by weight, viscosity may increase and thus, adhesion property may be poor, and when the content of the monofunctional acryl monomer is more than 35 parts by weight, UV curability may decrease and thus, productivity may also decrease.

In addition, when the content of the trifunctional acryl monomer is less than 7 parts by weight, viscosity may increase, and when the content of the trifunctional acryl monomer is more than 15 parts by weight, it has a had influence on overall properties of a coating layer.

The composition for UV coating according to the present invention may also include an additive in addition to the oligomer and the diluent.

The additive may include a photoinitiator. The photoinitiator may be, but is not limited to, a benzophenone-based photoinitiator, diphenoxy benzophenone-based photoinitiator, an anthraquinone derivative, a xantone derivative, a thioxantone derivative, or a benzyl-based photoinitiator. Currently available photoinitiators may include, but are not limited to, photoinitiators such as Micure HP-8, Irgacure 819, Darocur TPO, and Micure CP-4.

The content of the photoinitiator in the composition according to the present invention is not particularly limited, but may be in a range of 0.1 to 10 parts by weight. When the content of the photoinitiator is less than 0.1 parts by weight, curing may not be performed, and when the content of the photoinitiator is more than 10 parts by weight, physical properties may be degraded.

Meanwhile, a stabilizer may be used to facilitate the storage. Here, the stabilizer may be, but is not limited to, a phenol-based antioxidant, alkylated monophenol, alkylthiomethyl phenol, hydroquinone, alkylated hydroquinone, tocopherol, hydroxylated thiodiphenyl ether, alkylidenebisphenol, O-, N- and S-benzyl compounds, hydroxybenzylated malonate, an aromatic hydroxybenzyl compound, a triazine compound, an amine-based antioxidant, aryl amine, diaryl amine, polyaryl amine, acylaminophenol, oxamide, a metal inactivator, phosphite, phosphonite, benzylphosphonate, ascorbic acid, hydroxylamine, nitrone, thiosynergist, benzofuranone, or indolinone.

In addition, the composition for UV coating according to the present invention may further include a silane coupling agent to increase adhesive strength.

Particular examples of the silane coupling agent may include, but are not limited to, methacryloxypropyltrimethoxysilane, γ-methacryloxypropylethoxysilane, γ-chloropropylmethoxysilane, vinyltriethoxysilane, vinyltris(β-methoxyethoxy)silane, vinyltriacetoxysilane, γ-glycidotoxypropyltrimethoxysilane, γ-glycidoxypropyltriethoxysilane, β-(3,4-ethoxycyclohexyl)ethyltrimethoxysilane, vinyltrichlorosilane, γ-mercaptopropylmethoxysilane, γ-aminopropyltriethoxysilane, N-β-(aminoethyl)-γ-aminopropyltrimethoxysilane and a mixture thereof.

The present invention also relates to a method of treating a surface of a substrate including preparing a composition for UV coating including a compound prepared by modifying a hydroxyl group of a compound represented by Formula 2, and applying the composition to the substrate and curing the composition.

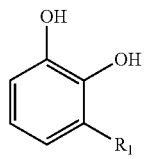

[Formula 2]

In Formula 2, $R_1$ is alkyl having 1 to 30 carbon atoms, alkylene having 2 to 30 carbon atoms, alkynyl having 2 to 30 carbon atoms, or aryl having 5 to 12 carbon atoms.

Specifically, the compound of Formula 2 may be alkyl having 12 to 25 carbon atoms, or alkylene having 12 to 25 carbon atoms.

More specifically, the compound of Formula 2 is $C_{15}H_{31-2n}$, and n may be one of 1 to 3.

Specifically, the compound of Formula 2 may be $(CH_2)_{14}$—$CH_3$, $(CH_2)_7CH$=$CH(CH_2)_5CH_3$, $(CH_2)_7CH$=$CHCH_2CH$=$CH(CH_2)_2CH_3$, $(CH_2)_7CH$=$CHCH_2CH$=$CHCH$=$CHCH_3$, or $(CH_2)_7CH$=$CHCH_2CH$=$CHCH_2CH$=$CH_2$.

In the method of treating a surface of a substrate according to the present invention, the step of modifying the compound of Formula 2 may include reacting the compound of Formula 2 with a compound containing a functional group that can be reacted with a hydroxyl group of the compound of Formula 2 in the presence of an organic solvent and a catalyst.

The compound of Formula 2 may be a natural or synthetic compound extracted from raw lacquer (or oriental lacquer), which can be extracted from *Toxicodendron vernicifluum*, or trees of the *Toxicodendron* family.

According to an exemplary embodiment of the present invention, when natural raw lacquer is used as the compound of Formula 2, the raw lacquer may be extracted according to the following method, but the present invention is not limited thereto.

First, the raw lacquer and an organic solvent are mixed in a weight ratio of 1:1 to 2, and stirred at 20 to 25° C. for 3 to 6 hours in a nitrogen atmosphere. When the mixing ratio of the organic solvent is less than 1, urushiol may not be sufficiently dissolved therein, and when the mixing ratio of the organic solvent is more than 2, it may take more time to use and recover the organic solvent.

The organic solvent may be methylenechloride, acetone or acetonitrile, and preferably methylenechloride, which is easily recovered at low temperature due to a low boiling point, and consumes low energy.

The lacquer may be used without limitation regardless of its original home.

After stirring, the mixed solution is filtered through a paper filter (Whatman, 100 μm pore size) and a teflon filter (Millipore, PTFE, 0.1 μm). Such a filtering method takes less time and money since this method does not use centrifugation.

The filtered solution is dried in a vacuum oven at 20° C. to remove the organic solvent.

The method of extracting urushiol is performed in a nitrogen atmosphere to prevent oxidation, and includes drying at low temperature to minimize side reactions of urushiol caused by heat.

The catalyst may be one or at least two of $SnOct_2$ and dibutyltin dilaurate (DBDTL).

The catalyst may be included at a content of 0.1 to 1 part by weight based on 100 parts by weight of the compound of Formula 2. Within the above range, the catalyst has high reactivity.

The organic solvent may be one or at least two of tetrahydrofuran, toluene, benzene, xylene, acetone, N-methyl-2-pyrrolidone, and dimethylformamide.

The compound of Formula 2 and the organic solvent may be mixed in a weight ratio of 1:2 to 4. When the weight ratio of the organic solvent is less than 1:2, reaction temperature is not easily controlled due to an increase in viscosity during the reaction and heat of reaction, and when the weight ratio of the organic solvent is more than 1:4, a large amount of the organic solvent needs to be removed.

In addition, the compound containing a functional group that can be reacted with a hydroxyl group may be a compound having an isocyanate group, an alkoxy group or a carboxyl group, a compound having a halogen atom, or a cyclic anhydride.

More specifically, the compound containing a functional group that can be reacted with a hydroxyl group may be R—N=C=O, R—O=C—X, R—COOH, $R_{4-x}$—Si—$(R')_x$, or R—R'. Here, R may be alkyl having 1 to 30 carbon atoms, alkylene having 2 to 30 carbon atoms, alkynyl having 2 to 30 carbon atoms, aryl having 5 to 12 carbon atoms, or aralkyl having 6 to 24 carbon atoms.

The substituent R may be substituted or unsubstituted with at least one substituent selected from the group consisting of alkyl having 1 to 12 carbon atoms, alkylene having 2 to 12 carbon atoms, alkynyl having 2 to 12 carbon atoms, and aryl having 5 to 12 carbon atoms. R' may be alkoxy having 1 to 12 carbon atoms, x may be an integer of 1 to 3, and y may be an integer of 1 to 4 carbon atoms.

The most specifically, the compound containing a functional group that can be reacted with a hydroxyl group may be one or at least two of benzyl isocyanate, hexyl isocyanate, 3-isoprophenyl-a,a-dimethyl benzyl isocyanate, methacryloyl chloride, alkyl silane, and a fatty acid succinic anhydride.

The reaction solution prepared by dissolving the compound of Formula 2 in the organic solvent, and the compound containing a functional group that can be reacted with a hydroxyl group may be mixed in a mole ratio of 1:2 to 2.1. When the mole ratio in the mixture is less than 1:2, the mixture may have a low degree of cure and low polymerization speed during polymerization due to the presence of an unreacted hydroxyl group, and when the mole ratio in the mixture is more than 1:2.1, due to the presence of an unreacted functional group (isocyanate) in the reaction product, a purification process may be needed to remove the unreacted functional group, or a final product may have toxicity or a bad influence on the appearance of a film.

In addition, the compound of Formula 2 may be modified at a temperature of 30 to 50° C. When the temperature is less than 30° C., the reaction takes too much time, and when the temperature is more than 50° C., the heat of reaction is difficult to control due to a fast reaction speed, and a side reaction (a biuret reaction) of the functional group (isocyanate) and formation of allophanate may occur.

In addition, the substrate may be metal, wood, plastic, leather or paper.

The metal may be a steel sheet, for example, a cold-rolled steel sheet, a galvanized steel sheet, an electrogalvanized steel sheet, a hot-dipped galvanized steel sheet, a coated steel sheet containing an impurity which is cobalt, molybdenum, tungsten, nickel, titanium, aluminum, manganese, ferrous magnesium, tin, copper or a mixture thereof; or a hetero metal, an aluminum alloy sheet to which silicon, copper-magnesium, iron, manganese, titanium, zinc or a mixture thereof is added, a galvanized steel sheet coated with a phosphate, or a hot-rolled steel sheet. However, the present invention is not limited thereto.

The present invention also relates to a surface-treated substrate including a substrate and a coating layer formed on one or both surfaces of the substrate by curing a composition for UV coating according to the present invention.

The surface-treated substrate according to the present invention may be formed by applying a composition for UV coating to one or both surfaces of the substrate, and forming a coating layer to a thickness of 1 to 20 μm through UV photocuring. Thus, the substrate may maintain environment-friendly properties such as excellent antibacterial activity, high scratch resistance and excellent surface gloss on the coated surface, and have healthy functionalities such as far-infrared radiation, blocking of electromagnetic waves or enhanced corrosion resistance.

The substrate may be metal, wood, plastic, leather or paper, but the present invention is not limited thereto.

As the substrate, metal may be a steel sheet, and the kind of steel sheet is described above.

The present invention is also related to a product using a surface-treated substrate.

The surface-treated substrate according to the present invention may be used in electric appliances requiring excellent appearance and functionalities, or interior and exterior materials in construction for walls, ceilings, partitions, etc. due to excellent antibacterial activity, high gloss, high image clarity, and excellent scratch resistance.

Hereinafter, the present invention will be described in further detail according to Example and Test results, but the scope of the present invention is not limited to the following Example.

Example 1

Preparation of UV Coating Solution

To extract urushiol from raw lacquer, the raw lacquer was added to methylenechloride in a weight ratio of 1:1, and the resulting solution was stirred at approximately 23° C. for approximately 4 hours in a nitrogen atmosphere.

After stirring, the solution was filtered through a paper filter (Whatman, 100-μm pore size), and filtered again through a teflon filter (Millipore, PTFE, 0.1-μm).

The filtered solution was dried in a vacuum oven at 20° C. to remove methylenechloride.

Figure 3:
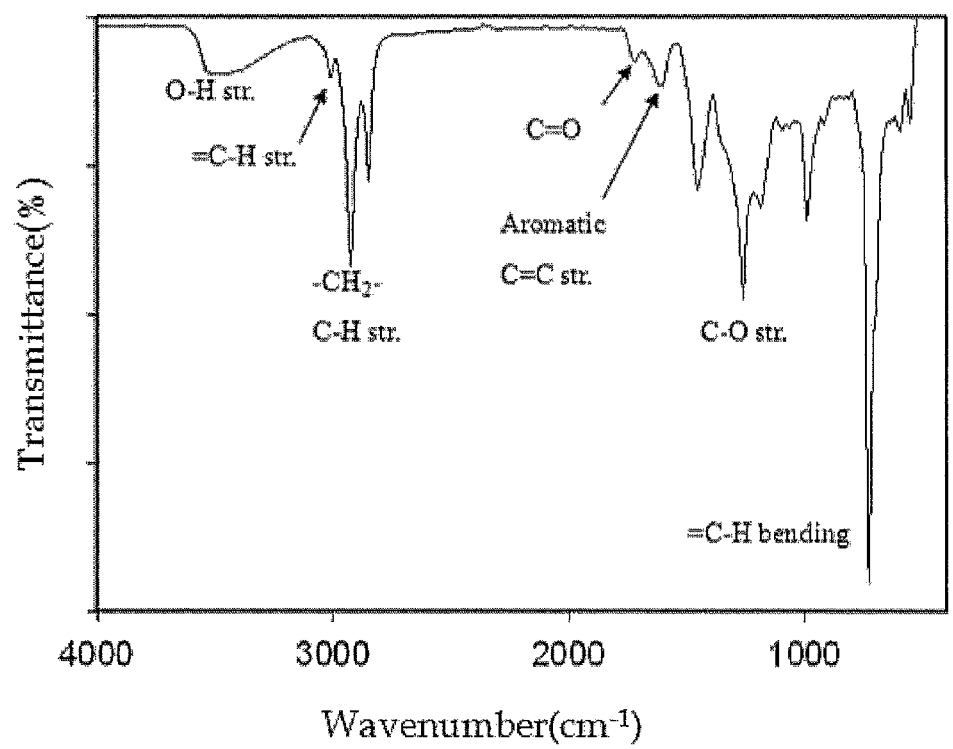
FIG. 3 illustrates FT-IR spectrum data of urushiol extracted from raw lacquer according to the present invention.
Figure 4:
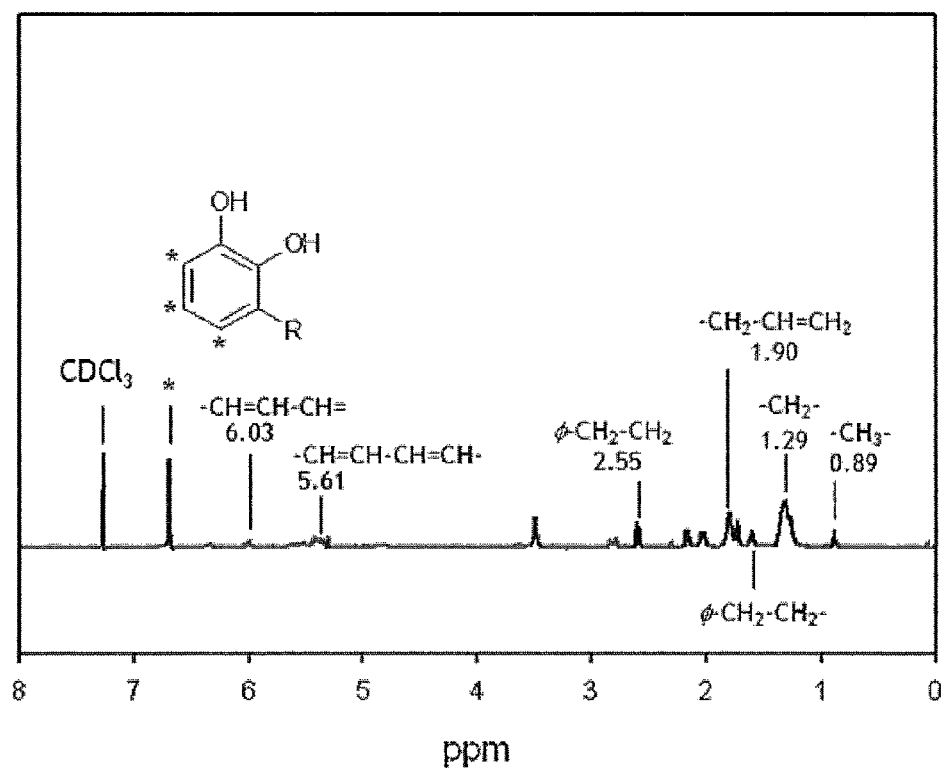
FIG. 4 illustrates 1H-NMR data of urushiol extracted from raw lacquer according to the present invention.
Figure 5:
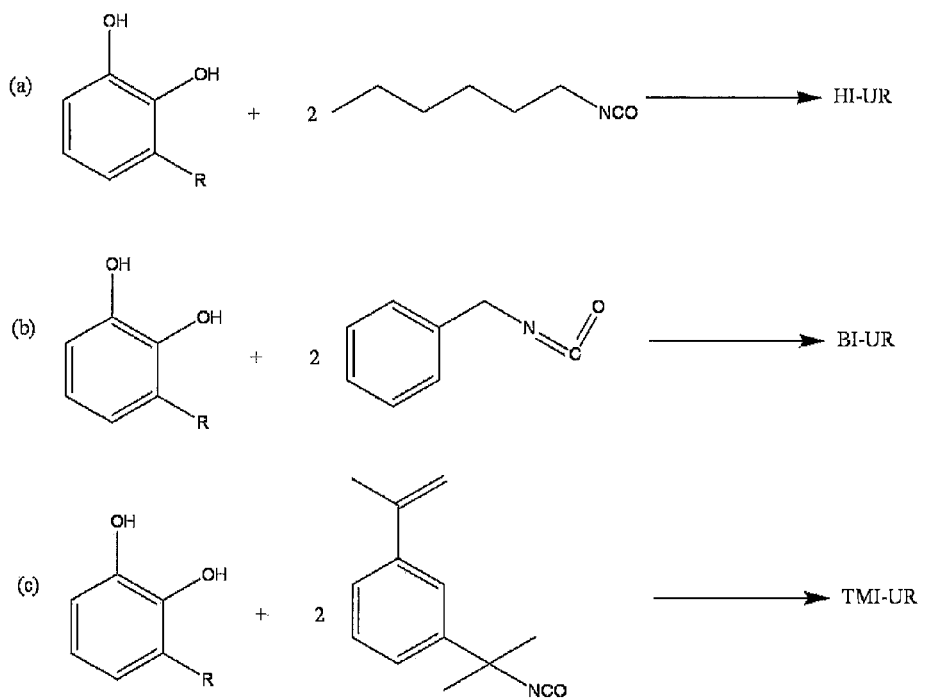
FIG. 5 illustrates an example of a modification reaction for urushiol extracted from raw lacquer according to the present invention.
Figure 6:
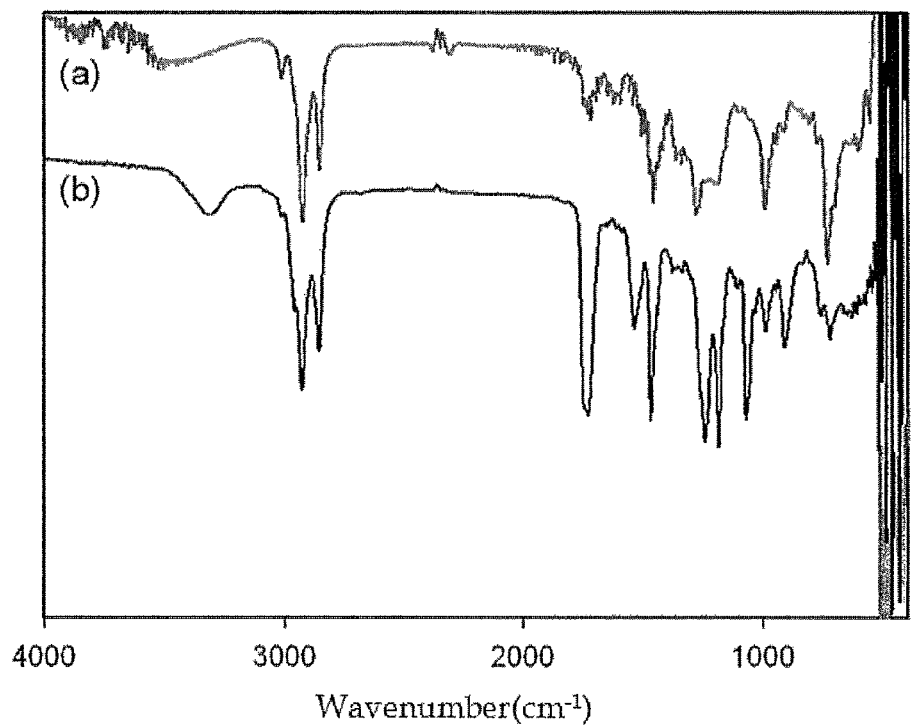
FIG. 6 illustrates FT-IR spectrum data of urushiol extracted from raw lacquer (a) and modified urushiol (b) according to the present invention.
Figure 7:
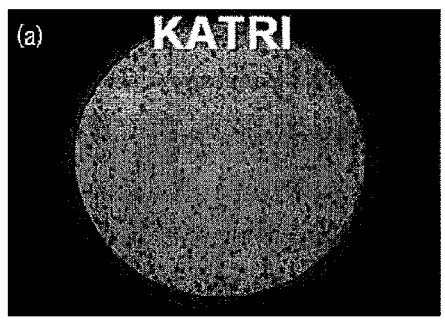
FIG. 7 illustrates results of antibacterial activity of a steel sheet measured using UV coating agents including a control group (a), urushiol extracted from raw lacquer (b), urushiol modified with 5% hexyl isocyanate (c), and urushiol modified with 10% hexyl isocyanate (d)
Figure 7:
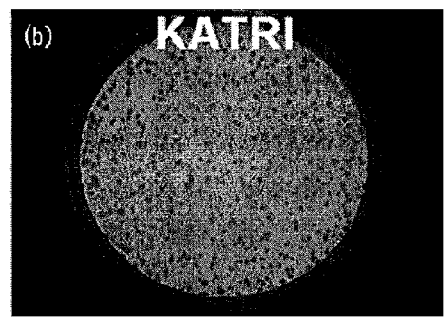
Figure 7:
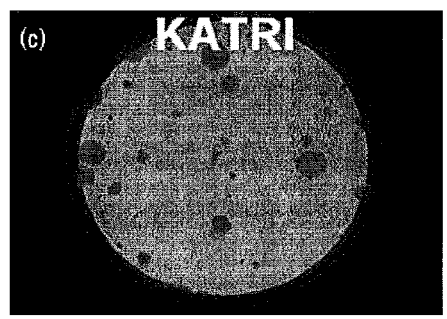
Figure 7:
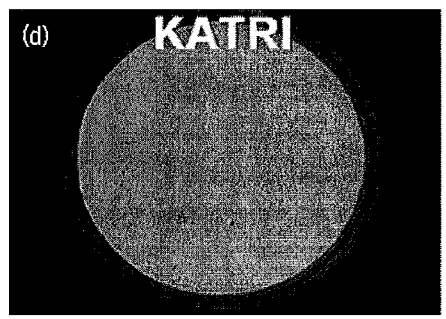

An FT-IR spectrum and $^1$H-NMR data to urushiol extracted are shown in FIGS. 3 and 4, respectively.

Afterward, monoisocyanate that can be reacted with a hydroxyl group of the extracted urushiol was introduced to block the hydroxyl group. Detailed description of the above step is as follows:

Urushiol was mixed with tetrahydrofuran in a weight ratio of 1:2 to melt in the presence of tin octoate ($SnOct_2$, 0.1 parts by weight).

Monoisocyanate (hexylisocyanate, benzylisocyanate or TMI® (Meta, Cytec) was slowly added to the solution, and the resulting mixture was reacted at approximately 40° C. An intensity of an NCO peak detected at 2270-3 $cm^{-1}$ through real-time FT-IR analysis was observed during the reaction, and time to complete the reaction and an amount of consumed monoisocyanate were determined.

An antibacterial UV coating solution was prepared by homogeneously mixing the modified urushiol completed in the reaction (HI-UR: modified into hexylisocyanate, BI-UR: modified into benzylisocyanate, and TI-UR: modified into TMI® (Meta, Cytec)) with unmodified UR under the same conditions. The prepared coating solution was applied to a steel sheet, and then an antibacterial UV coating steel sheet was prepared through UV photocuring.

Specifically, a paint composition was prepared by mixing 35 g of a modified epoxy acrylate oligomer [CN 150/80, Sartomer, U.S.A.], 15 g of an urethane acrylate oligomer [UA-5221, HS Chemtron, Korea], 30 g of a tetrahydroperfuril acrylate (THFA) [ST285, Sartomer, U.S.A.], 10 g of hexanediol diacrylate (HDDA) [Miramer M200, Miwon Corp., Korea], 8 g of a photoinitiator [Darocur 1173, Ciba Chemicals, Switsland], 0.5 g of a foaming agent [TEGO Airex 920, Evonik, Germany], 0.5 g of a labeling agent [TEGO Rad 2250, Ebvonik, Germany], and 1 g of an adhesion promoter. The composition was coated to a thickness of 0.5 to 20 μm or less on a coated steel sheet (GI, EG), and then cured at an intensity of radiation of 2000 mJ or less using a UV lamp.

Contents of the (modified or pure) urushiol and the photoinitiator in the antibacterial UV coating solution were shown in Table 1.

Antibacterial activity (KATRI, requested to Korean Apparel Testing & Research Institute) of the steel sheet coated with the antibacterial UV coating solution was measured by a method to be described below. The test method used herein was JIS Z2801, and strains used herein were *Staphylococcus aureus* (*S. aureus*, ATCC 6538P) and *Escherichia coli* (*E. coli*, ATCC 8739).

First, the strains were prepared in a nutrient broth, approximately 0.4 ml of the broth was placed on a specimen previously sterilized (3 specimens per sample, specimen size of the coated steel sheet=50 mm×50 mm), and then the specimen was covered with a sterilized polystyrene film (40 mm×40 mm). These samples were incubated in an incubator for 24 hours at 35° C., and incubated again in a neutralizer container included in a Stomacher bag. Afterward, the number of colonies of the strains produced from each specimen was counted, and the antibacterial activity (bacteria reduction value: R, bacteria reduction rate: %) was evaluated according to the following formula. As a control group, only a Stomacher bag was used without a steel sheet specimen.

Bacteria Reduction Value [Equation 1]

$$R = \log\left(\frac{B}{A}\right) - \log\left(\frac{C}{A}\right) = \log\left(\frac{B}{C}\right)$$

Bacteria Reduction Rate [Equation 2]

$$\% = \frac{(B-C)}{B} \times 100$$

In the above Equations, A is the initial number of colonies of the strains, B is the number of colonies of the strains in the control group after 24-hour incubation, and C is the number of colonies of the strains on the steel sheet specimen which undergone antibacterial treatment.

To analyze the degree of crosslinking (DC), a solvent extracting method was used. After the prepared antibacterial UV coating solution was coated on a steel sheet, the steel sheet was cured through UV radiation for 5 minutes. The specimen was put into and left in ethanol for 24 hours, and amounts of unreacted monomers and urushiol, which were melted in ethanol and thus remained, were measured through a weight method. The equation used for the weight method was as follows:

$$DC(\%) = \frac{W_0 - W_S}{W_0} \times 100 \qquad \text{[Equation 3]}$$

In Equation 3, $W_0$ is the weight of the coating solution coated on the specimen, and $W_S$ is the weight of the coating solution melted in ethanol.

Conditions for measurement of nano hardness of a steel sheet are as follows:

Measuring Tip: Berkovich diamond tip (D=7.53 h, A=24.56 $h_c^2$)

Analysis Temperature: 20° C.

Maximum Load=500 mN

An average value of the specimens was used.

In addition, gloss was measured using a gloss meter. An angle selector was fixed at 60 degrees, and a black gloss standard plate was placed on a sample stand. A switch was turned on and left for 1 to 2 minutes. A standardizing control knob was lifted to adjust gloss of the standard plate until the gloss of the standard plate reached 96.4%. Then, a specimen to be tested was switched with the standard plate, and then a scale of micro ampere was read (but, an average value was calculated after ten-time measurements).

Tensile strength was tested using a tensile strength tester (universal measurer) until the specimen was broken after the specimen was set on the tester. Test speed was 50 mm/min, and end load reduction was 90%.

The following Tables 1 to 3 show results obtained by measuring physical properties of a UV coating solution of the present invention according to photocuring.

TABLE 1

Results obtained by measuring physical properties of prepared antibacterial UV coating solution according to photocuring

| Test Items | | | Pure UV Coating Solution | 10 parts by weight Pure UR-containing UV Coating Solution | 5 parts by weight HI-UR-containing UV Coating Solution | 10 parts by weight HI-UR-containing UV Coating Solution | 10 parts by weight RI-UR-containing UV Coating Solution | 10 parts by weight TMI-UR-containing UV Coating Solution |
|---|---|---|---|---|---|---|---|---|
| Antibacterial Activity | *E. coli* | Bacteria Reduction Value (R) | 0.1 | 1.0 | 2.7 | 4.3 | 4.2 | 4.4 |
| | | Bacteria Reduction Rate (%) | 24.9 | 90.1 | 99.8 | 99.9 | 99.9 | 99.9 |

TABLE 1-continued

Results obtained by measuring physical properties of prepared antibacterial UV coating solution according to photocuring

| Test Items | | Pure UV Coating Solution | 10 parts by weight Pure UR-containing UV Coating Solution | 5 parts by weight HI-UR-containing UV Coating Solution | 10 parts by weight HI-UR-containing UV Coating Solution | 10 parts by weight RI-UR-containing UV Coating Solution | 10 parts by weight TMI-UR-containing UV Coating Solution |
|---|---|---|---|---|---|---|---|
| S. aureus | Bacteria Reduction Value (R) | >4.0 | >4.3 | >4.5 | >5.0 | >4.9 | >5.3 |
| | Bacteria Reduction Rate (%) | >99.9 | >99.9 | >99.9 | >99.9 | >99.9 | >99.9 |
| Content of Initiator (part by weight) | | — | >5 | 1 | <3 | <3 | <3 |
| Degree of Cure (%) | | >99 | <60 | >99 | >99 | | |
| Cure Time (min.) | | <3 | >20 | <3 | <3 | | |

TABLE 2

Results of Measuring Gloss

| | Gloss | | |
|---|---|---|---|
| | 20 degrees | 60 degrees | 85 degrees |
| Not containing Urushiol | 80.1 | 89.1 | 93.8 |
| Containing Urushiol | 63.8 | 94.3 | 95.3 |

TABLE 3

Results of Measuring Tensile Strength

| Sample ID | Urushiol (part by weight) | Tensile Strength (MPa) | Young's Modulus (MPa) |
|---|---|---|---|
| 0 | 0 | 15.2 | 44.3 |
| 1 | 10 | 26.3 | 295.6 |
| 2 | 15 | 27.4 | 493.0 |
| 3 | 20 | >No Data of Maximum Load | |

As shown in Table 1, the pure UV coating solution does not have antibacterial activity at all, and the UV coating solution to which 10 parts by weight of unmodified urushiol is introduced has a low bacteria reduction rate with respect to E. coli. In this case, the most serious problems are a low degree of cure and considerably long cure time although a high content of the initiator is required.

The UV coating solutions containing 5 and 10 parts by weight of urushiol modified with hexyl isocyanate have high antibacterial activities with respect to E. coli. This is caused by the highly active curing reaction of the modified urushiol. A radical resonance stabilization effect of a catechol structure is inhibited by blocking a hydroxyl group of the urushiol, and thus the consumption of radicals and the delay in reaction are inhibited. In addition, due to an excellent degree of cure, a coating film whose external appearance has excellent gloss may be obtained.

As shown in Table 2, due to introduction of urushiol, the gloss is increased. The increase in gloss is considered to be caused by the high gloss property of urushiol, and the samples also have an outstanding difference in image clarity as well as high gloss when seen with the naked eye, compared to the measured values.

As shown in Table 3, as the content of urushiol is increased, tensile strength is also increased.

Figure 8:
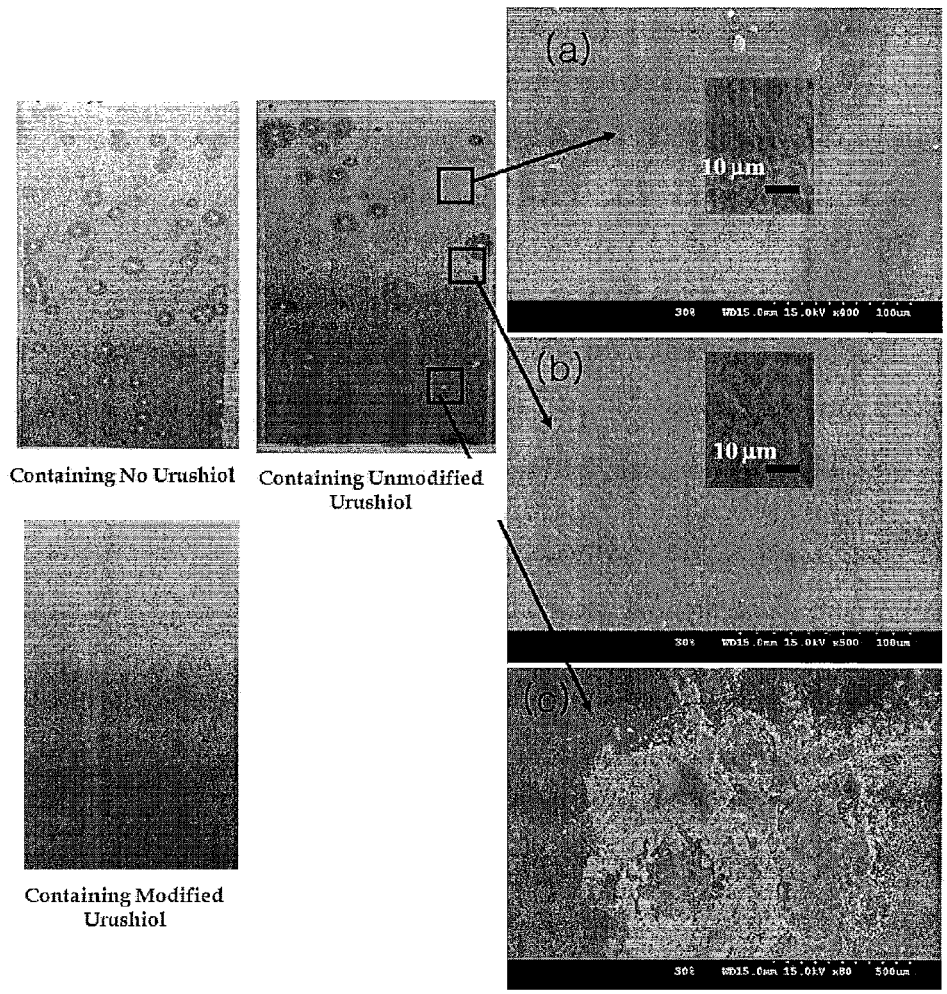
FIGS. 8 and 9 illustrate results of a corrosion resistance test (salt spray test (SST)) according to treatment of modified urushiol derived from raw lacquer according to the present invention.
Figure 9:
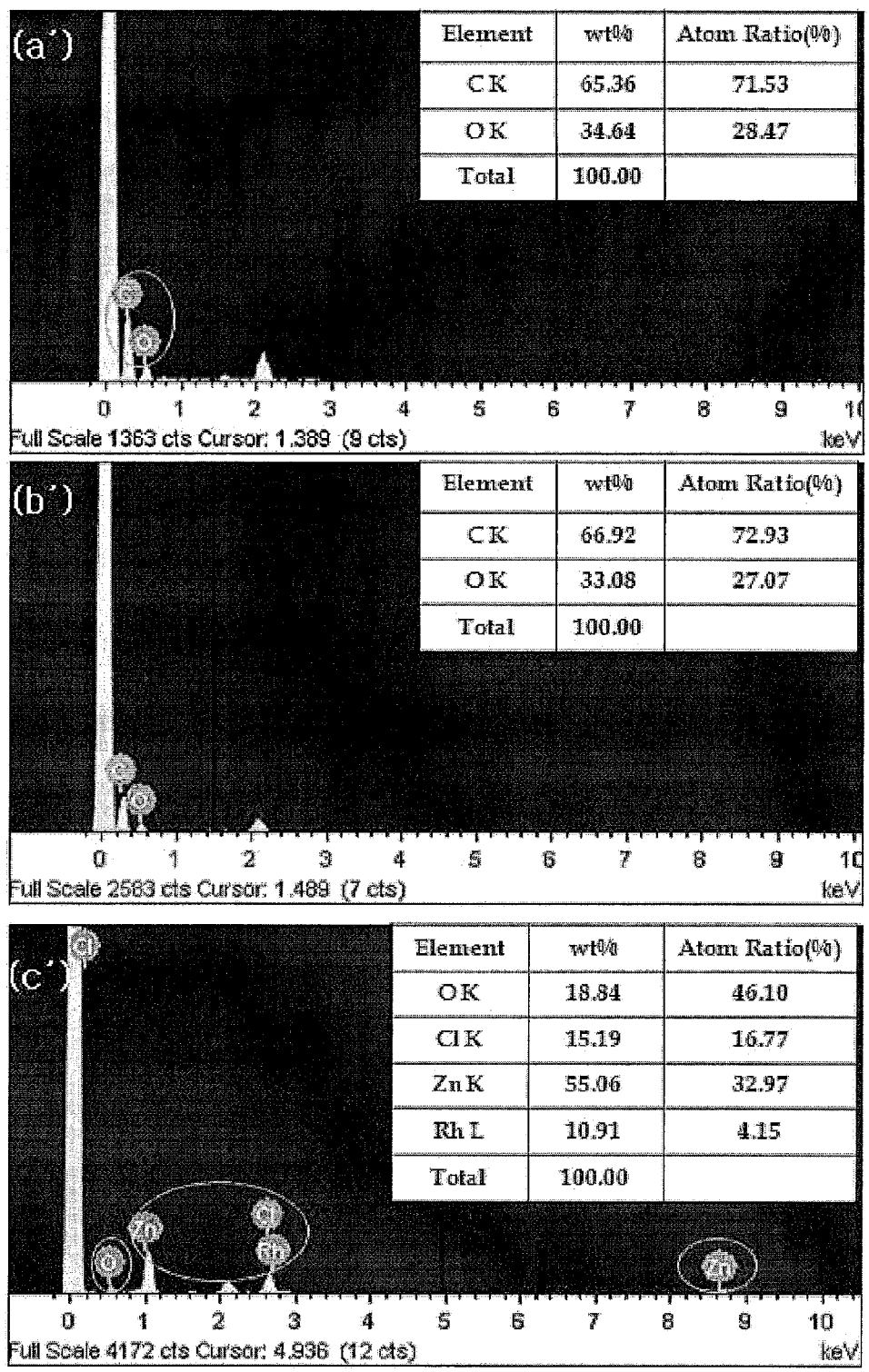

In addition, FIGS. 8 and 9 illustrate results of corrosion resistance test (Salt Spray Test (SST)). When the UV coating solution contains unmodified urushiol, a surface of the coated layer is not cured due to a low curing efficiency, and thus the coated layer is cracked and whitening occurs. In the solution containing no urushiol, corrosion resistance is degraded, and in the solution containing modified urushiol, whitening does not occur due to an effect of enhancing corrosion resistance (anti-corrosion performance), which is a characteristic of urushiol.

Therefore, while an annealed steel sheet needs an undercoat to obtain corrosion resistance in addition to SST having the corrosion resistance effect, though urushiol is coated once, desired corrosion-resistant performance may be realized.

Figure 10:
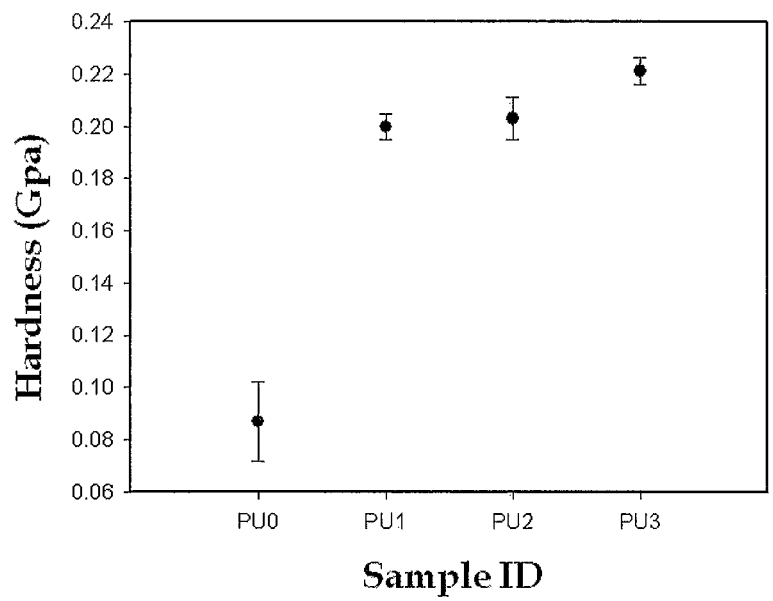
FIG. 10 illustrates results of nano hardness according to treatment of modified urushiol derived from raw lacquer according to the present invention.
Figure 10:
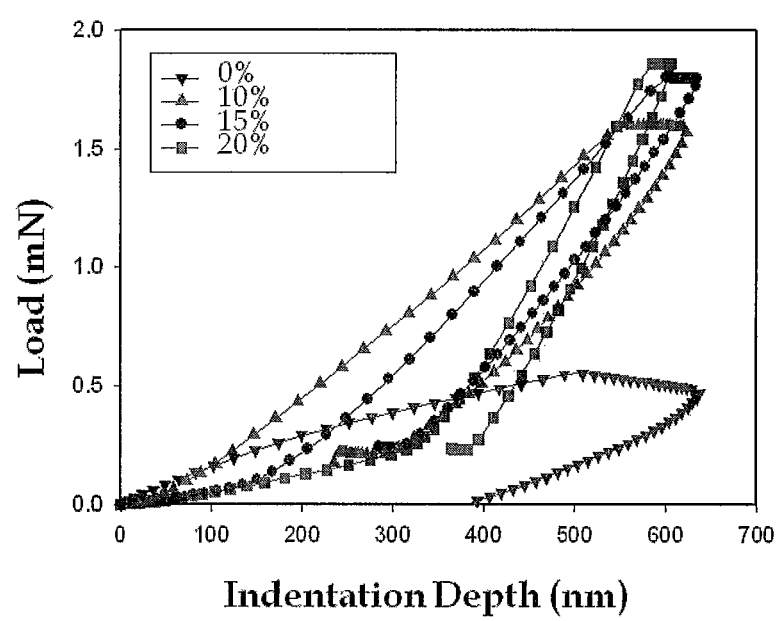
Figure 11:
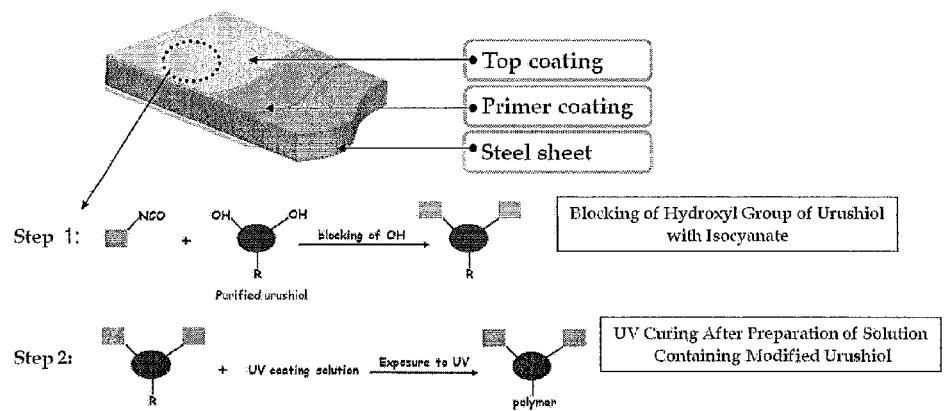
FIG. 11 illustrates a UV curing technique for a steel sheet using modified urushiol derived from raw lacquer according to the present invention.

FIG. 10 illustrates results of measuring nano hardness according to the treatment of modified urushiol derived from raw lacquer according to the present invention. It shows that a solution containing the modified urushiol has a higher hardness, that is, better scratch resistance, than a pure UV coating solution.

The present invention may be applied for electrical appliances requiring excellent appearance and functionality, or interior and exterior materials in construction for walls, ceilings, partitions, etc.

According to the present invention, since a hydroxyl group of urushiol exhibiting an antibacterial property of lacquer is blocked to remove reactivity, when a composition can be used as a UV coating agent, a substrate can have excellent antibacterial effect, far infrared radiation, blocking of electromagnetic waves, enhanced corrosion resistance, excellent surface gloss, high scratch resistance, and high crosslinking speed even when a low content of a photoinitiator is used.

While the invention has been shown and described with reference to certain exemplary embodiments thereof, it will be understood by those skilled in the art that various changes in form and details may be made therein without departing from the scope of the invention as defined by the appended claims.

What is claimed is:

1. A composition for coating surface of steel sheet, comprising:
a binder comprising an oligomer and an acrylate monomer, in which the oligomer includes a urethane-based modified epoxy acrylate and a urethane acrylate, and the acrylate monomer includes a monofunctional acrylate monomer and a trifunctional acrylate monomer; and a compound represented by Formula 1:

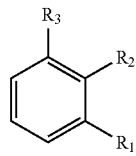

[Formula 1]

wherein, $R_1$ is alkyl having 12 to 25 carbon atoms or alkylene having 12 to 25 carbon atoms, $R_2$ and $R_3$ are independently —O—C(O)NHR, —O—C(O)—R, —O—Si(R)$_x$(R')$_{3-x}$, —O—C(R)$_x$(R')$_{3-x}$, or —O—C(O)—(CH$_2$)$_y$—C(O)—OH, R is alkyl having 1 to 12 carbon atoms, aryl having 5 to 12 carbon atoms, or aralkyl having 6 to 12 carbon atoms, the substituent R may be substituted or unsubstituted with at least one substituent selected from the group consisting of alkyl having 1 to 6 carbon atoms, alkylene having 2 to 6 carbon atoms, and aryl having 5 to 12 carbon atoms, R' is alkoxy having 1 to 6 carbon atoms, x is an integer of 1 to 3, and y is an integer of 1 to 4, wherein said composition is curable by UV irradiation.

2. The composition of claim 1, wherein $R_1$ is $C_{15}H_{31-2n}$, and n is one of 1 to 3, $R_2$ and $R_3$ are independently —O—C(O)NHR, and R is aralkyl having 6 to 12 carbon atoms, which is substituted or unsubstituted with alkyl having 1 to 12 carbon atoms or alkylene having 2 to 6 carbon atoms.

3. The composition of claim 1, wherein $R_1$ is (CH$_2$)$_{14}$CH$_3$, (CH$_2$)$_7$CH═CH(CH$_2$)$_5$CH$_3$, (CH$_2$)$_7$CH═CHCH$_2$CH═CH (CH$_2$)$_2$CH$_3$, (CH$_2$)$_7$CH═CHCH$_2$CH═CHCH═CHCH$_3$, or (CH$_2$)$_7$CH═CHCH$_2$CH═CHCH$_2$CH═CH$_2$, $R_2$ and $R_3$ are independently —O—C(O)NHR, and R is aralkyl having 6 to 12 carbon atoms, which is substituted or unsubstituted with alkyl having 1 to 8 carbon atoms, benzyl or alkylene having 2 to 4 carbon atoms.

4. The composition of claim 1, wherein the compound of Formula 1 is included at a content of 1 to 50 parts by weight.

5. The composition of claim 1, wherein the oligomer includes 25 to 45 parts by weight of the urethane-based modified epoxy acrylate; and 10 to 25 parts by weight of the urethane acrylate.

6. The composition of claim 1, wherein the acrylate monomer includes 25 to 35 parts by weight of the monofunctional acrylate monomer; and 7 to 15 parts by weight of the trifunctional acrylate monomer.

7. The composition of claim 1, further comprising a photoinitiator.

8. The composition of claim 7, wherein the photoinitiator is at least one selected from the group consisting of a benzophenone containing photoinitiator, diphenoxy benzophenone containing photoinitiator, an anthraquinone derivative, a xantone derivative, a thioxantone derivative, or a benzyl containing photoinitiator.

9. The composition of claim 7, wherein the photoinitiator is included at a content of 0.1 to 10 parts by weight.

10. A surface-treated steel sheet, comprising:

a steel sheet; and a coating layer formed by curing the composition for coating surface of steel sheet according to claim 1 on one or both surfaces of the steel sheet.

11. A surface-treated steel sheet, comprising:

a steel sheet; and a coating layer formed by curing the composition for coating surface of steel sheet according to claim 3 on one or both surfaces of the steel sheet.

12. A surface-treated steel sheet, comprising:

a steel sheet; and a coating layer formed by curing the composition for coating surface of steel sheet according to claim 3 on one or both surfaces of the steel sheet.

13. A surface-treated steel sheet, comprising:

a steel sheet; and a coating layer formed by curing the composition for coating surface of steel sheet according to claim 5 on one or both surfaces of the steel sheet.

14. A composition for coating the surface of steel sheet, comprising:

a binder comprising an oligomer and a diluent, wherein the oligomer includes 25 to 45 parts by weight of the urethane-based modified epoxy acrylate, and 10 to 25 parts by weight of the urethane acrylate; and a compound represented by Formula 1:

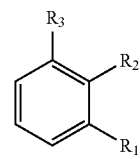

[Formula 1]

wherein, $R_1$ is alkyl having 1 to 30 carbon atoms, alkylene having 2 to 30 carbon atoms, alkynyl having 2 to 30 carbon atoms, or aryl having 5 to 12 carbon atoms, $R_2$ and $R_3$ are independently —O—C(O)NHR, —O—C(O)—R, —O—Si(R)$_x$(R')$_{3-x}$, —O—C(R)$_x$(R')$_{3-x}$, or —O—C(O)—(CH$_2$)$_y$—C(O)—OH, R is alkyl having 1 to 30 carbon atoms, alkylene having 2 to 30 carbon atoms, alkynyl having 2 to 30 carbon atoms, aryl having 5 to 12 carbon atoms, or aralkyl having 6 to 24 carbon atoms, the substituent R may be substituted or unsubstituted with at least one substituent selected from the group consisting of alkyl having 1 to 12 carbon atoms, alkylene having 2 to 12 carbon atoms, alkynyl having 2 to 12 carbon atoms, and aryl having 5 to 12 carbon atoms, R' is alkoxy having 1 to 12 carbon atoms, x is an integer of 1 to 3, and y is an integer of 1 to 4, wherein said composition is curable by UV irradiation.

15. A surface-treated steel sheet, comprising:

a steel sheet; and a coating layer formed by curing the composition for coating surface of steel sheet according to claim 14 on one or both surfaces of the steel sheet.

* * * * *

UNITED STATES PATENT AND TRADEMARK OFFICE
CERTIFICATE OF CORRECTION

PATENT NO. : 9,034,937 B2  
APPLICATION NO. : 13/519617  
DATED : May 19, 2015  
INVENTOR(S) : Hye Jin Yoo et al.

Page 1 of 1

It is certified that error appears in the above-identified patent and that said Letters Patent is hereby corrected as shown below:

Title page item (56), Column 2, OTHER PUBLICATIONS, Line 3, delete "Retrived" and insert -- Retrieved --

Title page item (56), Column 2, OTHER PUBLICATIONS, Line 3, delete "Retreived" and insert -- Retrieved --

In the claims,

Column 15, Line 65, Claim 8, delete "thioxantone" and insert -- thioxanthone --

Signed and Sealed this  
Tenth Day of November, 2015

Michelle K. Lee  
*Director of the United States Patent and Trademark Office*